US011570723B2

(12) United States Patent
Furuichi

(10) Patent No.: US 11,570,723 B2
(45) Date of Patent: Jan. 31, 2023

(54) MANAGEMENT SERVER, COMMUNICATION DEVICE, METHOD AND RECORDING MEDIUM

(71) Applicant: SONY GROUP CORPORATION, Tokyo (JP)

(72) Inventor: Sho Furuichi, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 17/235,963

(22) Filed: Apr. 21, 2021

(65) Prior Publication Data

US 2021/0243702 A1 Aug. 5, 2021

Related U.S. Application Data

(63) Continuation of application No. 16/308,872, filed as application No. PCT/JP2017/015192 on Apr. 13, 2017, now Pat. No. 11,006,372.

(30) Foreign Application Priority Data

Jul. 12, 2016 (JP) .............................. JP2016-138037

(51) Int. Cl.
*H04W 16/14* (2009.01)
*H04W 52/36* (2009.01)
(Continued)

(52) U.S. Cl.
CPC ....... *H04W 52/362* (2013.01); *H04W 52/146* (2013.01); *H04W 52/285* (2013.01); *H04W 52/42* (2013.01)

(58) Field of Classification Search
CPC ............... H04W 16/14; H04W 52/146; H04W 52/285; H04W 52/362; H04W 52/42; H04W 52/14; H04W 52/28; H04W 52/36
See application file for complete search history.

(56) References Cited

U.S. PATENT DOCUMENTS 5,457,794 A * 10/1995 Azumatani ....... G06F 16/90344
7,548,558 B2 * 6/2009 Rakib .................. H04J 3/0682
370/235
(Continued)

FOREIGN PATENT DOCUMENTS

CN 102202312 A 9/2011
CN 104254076 A 12/2014
(Continued)

OTHER PUBLICATIONS

English-language translation of International Search Report and Written Opinion for International Application No. PCT/JP2017/015192, dated Jun. 13, 2017.
(Continued)

*Primary Examiner* — Nathan S Taylor
(74) *Attorney, Agent, or Firm* — Xsensus LLP

(57) ABSTRACT

A mechanism which enables management of frequency resources while suppressing a calculation amount under an environment where location information of a communication device changes. A management server including: a creating unit to create list information; an acquiring unit to acquire a step size relating to transmission power setting of the communication device; a re-creation judging unit to judge whether or not to re-create the list information based on first location information when the list information has been created last time, second location information to be judged and the step size; and a notification unit to notify the communication device which uses the list information, of the re-created list information in a case where it is judged to re-create the list information and the list information created last time in a case where it is judged not to re-create the list information.

11 Claims, 8 Drawing Sheets

(51) Int. Cl.
*H04W 52/14* (2009.01)
*H04W 52/28* (2009.01)
*H04W 52/42* (2009.01)

(56) References Cited

U.S. PATENT DOCUMENTS

| | | | | |
|---|---|---|---|---|
| 9,713,012 | B2* | 7/2017 | Farshchian | G01S 7/023 |
| 2002/0013156 | A1* | 1/2002 | Yamamoto | H04B 7/01 |
| | | | | 455/69 |
| 2004/0028003 | A1* | 2/2004 | Diener | H04L 1/0001 |
| | | | | 370/373 |
| 2008/0170853 | A1* | 7/2008 | Rakib | H04L 12/2801 |
| | | | | 398/26 |
| 2013/0035125 | A1* | 2/2013 | Lee | H04W 16/14 |
| | | | | 455/509 |
| 2014/0219235 | A1* | 8/2014 | Kimura | H04W 52/16 |
| | | | | 370/329 |
| 2014/0226498 | A1* | 8/2014 | Soliman | H04W 52/362 |
| | | | | 370/252 |
| 2016/0073269 | A1* | 3/2016 | Bajko | H04W 4/20 |
| | | | | 370/329 |
| 2016/0198476 | A1* | 7/2016 | Rudolf | H04W 52/46 |
| | | | | 370/338 |
| 2017/0127325 | A1* | 5/2017 | Vikberg | H04W 36/14 |
| 2017/0310378 | A1* | 10/2017 | Kim | H04B 7/06 |
| 2019/0191444 | A1* | 6/2019 | Park | H04L 5/0051 |
| 2020/0083939 | A1* | 3/2020 | Park | H04L 5/0051 |

FOREIGN PATENT DOCUMENTS

| | | |
|---|---|---|
| JP | 2008538465 A | 10/2008 |
| JP | 2013-078096 A | 4/2013 |
| JP | 2014138368 A | 7/2014 |
| JP | 5679033 B2 | 3/2015 |
| WO | 2015/151138 A1 | 10/2015 |

OTHER PUBLICATIONS

European Extended Search Report dated Apr. 17, 2019, issued in corresponding European Patent Application No. 17827203.5.

* cited by examiner

MANAGEMENT SERVER, COMMUNICATION DEVICE, METHOD AND RECORDING MEDIUM

CROSS-REFERENCE TO RELATED APPLICATIONS

This application is a continuation of U.S. application Ser. No. 16/308,872, filed Dec. 11, 2018 which is based on PCT/JP2017/015192, filed on 13 Apr. 2017, and claims priority to Japanese Patent Application No. 2016-138037, filed on 12 Jul. 2016, the entire contents of each of which are incorporated herein by reference.

TECHNICAL FIELD

The present disclosure relates to a management server, communication device, method and recording medium.

BACKGROUND ART

In recent years, various kinds of radio systems such as a cellular network, a wireless local area network (LAN), a TV broadcasting system, a satellite communication system, and program making special events (PMSE) are in widespread use. To allow each radio system to normally operate, it is desirable that frequency resources to be utilized are managed so that interference does not occur among the radio systems. This is also similarly desirable among local networks included in one radio system.

Regarding management of frequency resources, as one measure for alleviating depletion of frequency resources in the future, frequency sharing is studied. For example, a mechanism for causing a frequency channel allocated to one radio system to be temporarily utilized by another radio system is studied. There is a case where such a mechanism is also referred to as frequency secondary utilization. In general, a system to which a frequency channel has been allocated by priority is called a primary system, and a system that secondarily utilizes the frequency channel is called a secondary system.

A number of technologies for appropriately managing frequency resources have been developed. For example, the following Patent Literature 1 discloses a technology of suppressing a case where communication by base stations becomes a cause of interference by frequencies being allocated in accordance with locations of the base stations.

CITATION LIST

Patent Literature

Patent Literature 1: JP 5679033B

DISCLOSURE OF INVENTION

Technical Problem

However, while, in the above-described technology disclosed in Patent Literature 1, or the like, a location of a communication device which utilizes frequency resources is taken into account, a measure in the case where location information changes by movement, or the like, of the communication device is not sufficient. For example, every time the location information changes, recalculation for frequency resource management based on the changed location information occurs. Therefore, under an environment where, for example, there are a number of communication devices, a communication device frequently moves, or there is variation in location information by influence of positioning accuracy, or the like, a calculation amount for frequency resource management can be enormous. Accordingly, it is desirable to provide a mechanism which enables appropriate management of frequency resources while suppressing a calculation amount under an environment where location information of a communication device changes.

Solution to Problem

According to the present disclosure, there is provided a management server including: a creating unit configured to create list information including one or more combinations of frequency information and transmission power information in accordance with location information of a communication device; an acquiring unit configured to acquire a step size relating to transmission power setting of the communication device; a re-creation judging unit configured to judge whether or not to re-create the list information on the basis of first location information when the list information has been created last time, second location information to be judged and the step size; and a notification unit configured to notify the communication device which uses the list information, of the re-created list information in a case where it is judged to re-create the list information and the list information created last time in a case where it is judged not to re-create the list information.

In addition, according to the present disclosure, there is provided a communication device including: a notification unit configured to notify a management server of information indicating a step size relating to transmission power setting.

In addition, according to the present disclosure, there is provided a method including: creating list information including one or more combinations of frequency information and transmission power information in accordance with location information of a communication device; acquiring a step size relating to transmission power setting of the communication device; judging by a processor whether or not to re-create the list information on the basis of first location information when the list information has been created last time, second location information to be judged and the step size; and notifying the communication device which uses the list information, of the re-created list information in a case where it is judged to re-create the list information and the list information created last time in a case where it is judged not to re-create the list information.

In addition, according to the present disclosure, there is provided a method including: notifying a management server of information indicating a step size relating to transmission power setting, by a processor.

In addition, according to the present disclosure, there is provided a recording medium having a program recorded thereon, the program causing a computer to function as: a creating unit configured to create list information including one or more combinations of frequency information and transmission power information in accordance with location information of a communication device; an acquiring unit configured to acquire a step size relating to transmission power setting of the communication device; a re-creation judging unit configured to judge whether or not to re-create the list information on the basis of first location information when the list information has been created last time, second location information to be judged and the step size; and a notification unit configured to notify the communication device which uses the list information, of the re-created list information in a case where it is judged to re-create the list information and the list information created last time in a case where it is judged not to re-create the list information.

In addition, according to the present disclosure, there is provided a recording medium having a program recorded thereon, the program causing a computer to function as: a notification unit configured to notify a management server of information indicating a step size relating to transmission power setting.

Advantageous Effects of Invention

As described above, according to the present disclosure, a mechanism is provided which enables appropriate management of frequency resources while suppressing a calculation amount under an environment where location information of a communication device changes. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
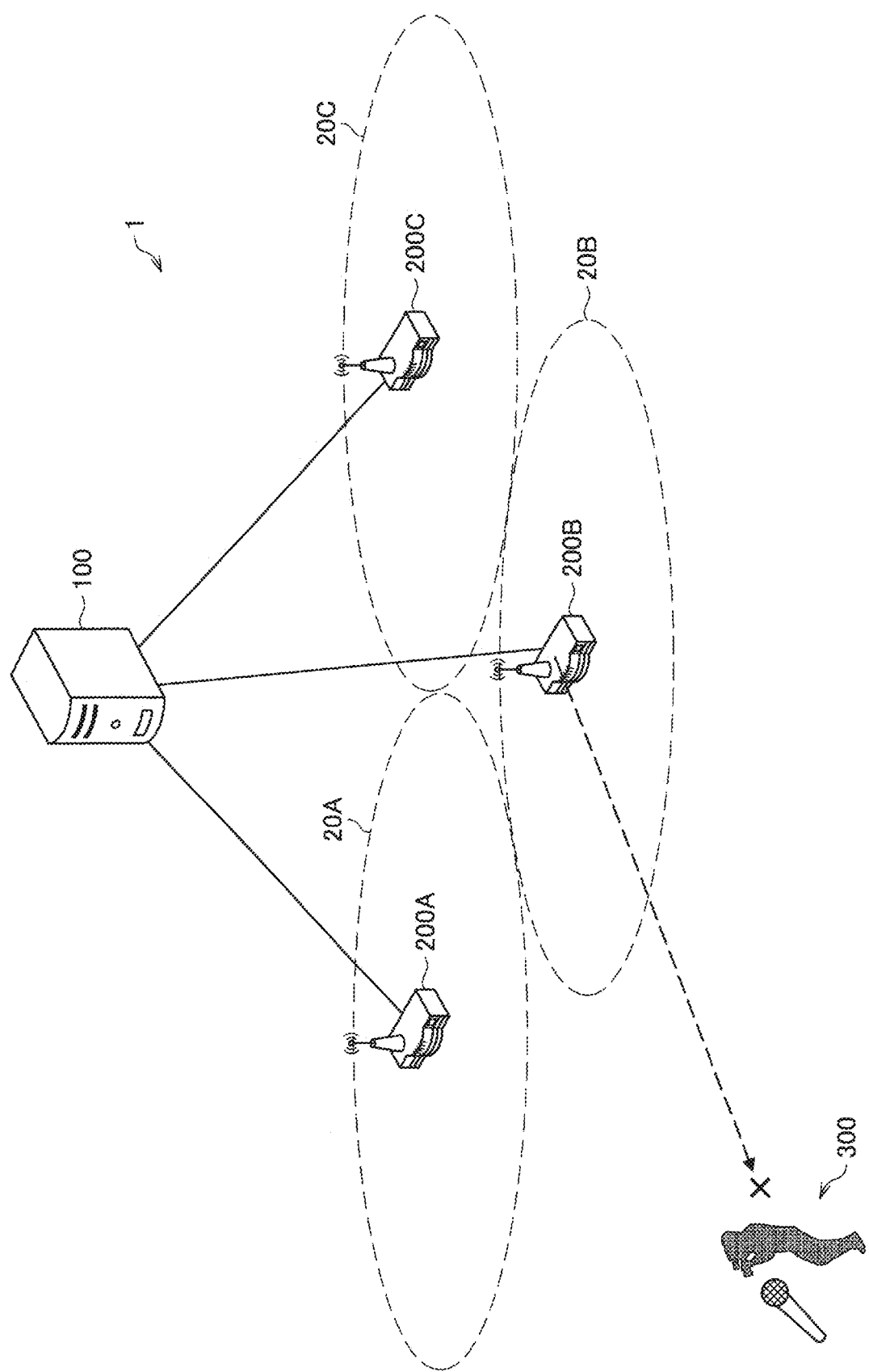
FIG. 1 is a drawing illustrating an example of a configuration of a system according to the embodiment.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in the present specification and drawings, elements that have substantially the same function and structure are distinguished in some cases by adding different alphabets after the same reference numerals. For example, a plurality of elements that have substantially the same function and structure are distinguished like portable communication devices 200A, 200B, and 200C according to necessity. However, in a case where it is not particularly necessary to distinguish among a plurality of elements that have substantially the same function and structure, the same reference numerals are merely given. For example, in the case where it is not particularly necessary to distinguish among the portable communication devices 200A, 200B, and 200C, they are simply referred to as a portable communication device 200.

Note that description will be provided in the following order.

1. Introduction
1.1 System configuration example
1.2. Frequency sharing
1.3. Technical problems
2. Configuration examples of respective devices
2.1. Configuration example of frequency management server
2.2. Configuration example of portable communication device
3. Processing flow
4. Application example
5. Conclusion <<1. Introduction>>
<1.1. System Configuration Example>

First, an example of a configuration of a system 1 according to an embodiment of the present disclosure will be described with reference to FIG. 1.

FIG. 1 is a drawing illustrating an example of the configuration of the system 1 according to the present embodiment. As illustrated in FIG. 1, the system 1 includes a frequency management server 100 and a plurality of portable communication devices 200 (200A, 200B and 200C).

The portable communication device 200 is a movable communication device. The portable communication device 200 has a function as a so-called base station, and provides wireless communication service to other communication devices within a service providing area 20. The service providing area 20 can be operated in conformity with arbitrary communication standards such as LTE, LTE-A, 5G, wireless LAN, Wi-Fi (registered trademark) and Bluetooth (registered trademark). Note that communication standards may be different or the same between different service providing areas 20 (for example, between 20A and 20B, between 20A and 20C or between 20B and 20C).

The frequency management server 100 manages the portable communication devices 200. For example, the frequency management server 100 manages frequency resources, transmission power, or the like, to be utilized by the respective portable communication devices 200 so that fatal interference is not provided to a primary system 300 and so that communication quality at an edge portion of the service providing area is secured. The primary system 300 is, for example, a PMSE, or the like. The frequency management server 100 is connected to the portable communication devices 200 with an arbitrary network such as the Internet, a core network and a wired/wireless LAN network.

<1.2. Frequency Sharing>

The configuration example of the system 1 has been described above. Subsequently, frequency sharing will be described as an example of a scenario to which the above-described system 1 is applied. Introduction of frequency sharing is studied all over the world as one measure for alleviating depletion of frequency resources in the future.

Typical regulations of radio waves relating to frequency sharing which is currently studied are indicated in the following Table 1.

TABLE 1

| Country/area | Frequency band | Regulations |
|---|---|---|
| United States | TV band | C.F.R Part 15 |
| United States | 3.55-3.70 GHz | C.F.R Part 96 |
| Europe | TV band | ETSI EN 301 598 |
| United Kingdom | TV band | Wireless Telegraphy (White Space Devices) (Exemption) Regulations 2015 |

Identifiers indicating a portable type or an anchored type are defined as categories of the communication devices in all regulations, and different requirements are defined for each category. As typical requirements, there is a geo-location capability. The geo-location capability includes a function of acquiring location information and a function of making a notification of the acquired location information.

Normally, the frequency management server calculates maximum allowable transmission power of the communication device based on location information of the communication so that interference power with respect to the primary system in a target frequency band is equal to or less than a threshold. Therefore, particularly, for a portable communication device, it is preferable that a positioning function such as a global positioning system (GPS) is implemented.

Concerning the geo-location function, protocol regarding access to the frequency management server is specified in, for example, "IETF RFC7545 Protocol to Access White Space database". In this protocol, a notification message of location information to be transmitted to the frequency management server by the communication device, and a notification message of setting information including maximum allowable transmission power in a target frequency band to be transmitted from the frequency management server to the communication device are specified. An example of the message transmission/reception procedure will be described with reference to FIG. 2.

Figure 2:
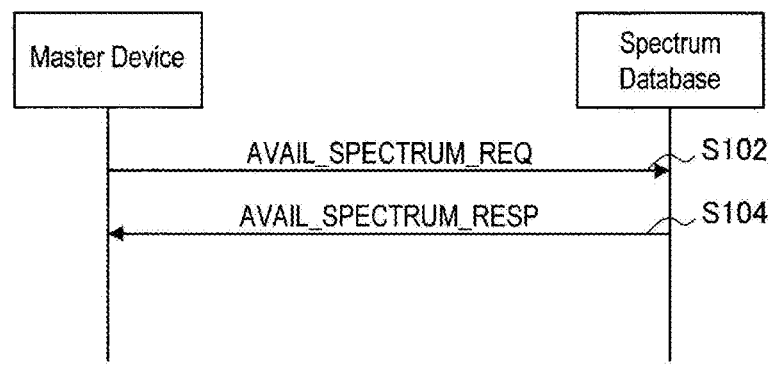
FIG. 2 is a sequence diagram illustrating an example of message transmission/reception procedure to be executed by a frequency management server and a communication device.

FIG. 2 is a sequence diagram illustrating an example of message transmission/reception procedure to be executed by the frequency management server and the communication device. A spectrum database in FIG. 2 corresponds to the frequency management server, and a master device corresponds to the communication device. As illustrated in FIG. 2, the master device transmits AVAIL_SPECTRUM_REQ to the spectrum database (step S102). Then, the spectrum database transmits AVAIL_SPECTRUM_RESP to the master device (step S104). The processing is finished as described above.

AVAIL_SPECTRUM_REQ is a request for generating information regarding an available frequency band. The information included in AVAIL_SPECTRUM_REQ is indicated in the following Table 2.

TABLE 2

AVAIL_SPECTURM_REQ

| Parameter name | Description |
|---|---|
| deviceDesc | device ID, or the like |
| location | location information of communication device |
| owner | owner information of communication device |

TABLE 2-continued

AVAIL_SPECTURM_REQ

| Parameter name | Description |
|---|---|
| antenna capabilities | antenna information operable frequency information |
| masterDeviceDesc | device ID, or the like, of master communication device (which is essential only for slave) |
| masterDeviceLocation | location information of master communication device (which is essential only for slave) |
| requestType | frequency request type |

AVAIL_SPECTRUM_RESP is a response to the request for generation from the communication device, the response including information regarding an available frequency band. The information included in AVAIL_SPECTRUM_RESP is indicated in the following Table 3.

TABLE 3

AVAIL_SPECTRUM_RESP

| Parameter name | Description |
|---|---|
| timestamp | response issue time |
| deviceDesc | device ID, or the like |
| spectrumSpecs | frequency utilization rule information in target frequency band (such as available period, bandwidth and transmission power) |

<1.3. Technical problems>

According to the above-described protocol, the frequency management server generates information regarding an available frequency band and makes a notification of a response every time the frequency management server receives a generation request including location information from the communication device. The frequency management server can suppress calculation load of the frequency management server by skipping re-calculation for a communication device for which transmission power has been calculated once in the case where location information does not change from the previous calculation, and notifying the communication device of the previous calculation result.

However, concerning a portable communication device, there is a case where this mechanism for suppressing calculation load does not function well. For example, even if the portable communication device is left at a specific location without being moved, there is a case where location information may vary every time positioning is performed due to accuracy, or the like, of the GPS. In such a case, although it is not actually necessary to perform re-calculation, re-calculation is performed at the frequency management server. In the case where there are a number of portable communication devices which access the frequency management server, load in association with this re-calculation becomes a problem for server operation.

Therefore, in view of the above-described circumstances, in the present embodiment, a mechanism which is capable of suppressing occurrence of unnecessary re-calculation is provided.

<<2. Configuration Examples of Respective Devices>>

An example of configurations of the frequency management server 100 and the portable communication device 200 will be described below with reference to FIG. 3 to FIG. 5.

<2.1. Configuration Example of Frequency Management Server>

Figure 3:
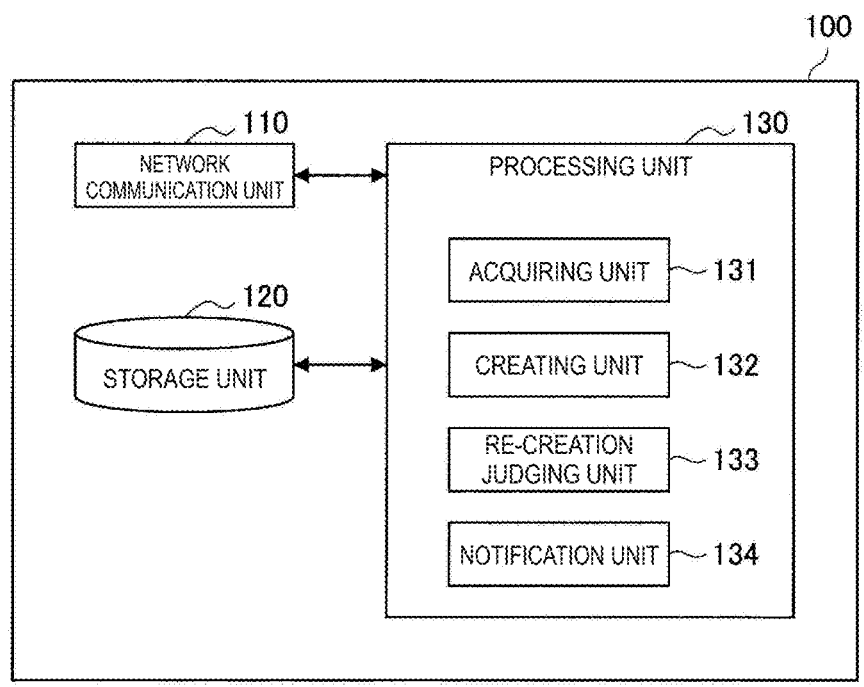
FIG. 3 is a block diagram illustrating an example of a logical configuration of the frequency management server according to the embodiment.

FIG. 3 is a block diagram illustrating an example of a logical configuration of the frequency management server 100 according to the present embodiment. As illustrated in FIG. 3, the frequency management server 100 includes a network communication unit 110, a storage unit 120 and a processing unit 130.

(1) Network Communication Unit 110

The network communication unit 110 transmits/receives information. For example, the network communication unit 110 transmits information to other nodes, and receives information from other nodes. For example, the above-described other nodes include the portable communication devices 200 under management, a database regarding the portable communication devices 200, or the like.

(2) Storage Unit 120

The storage unit 120 temporarily or permanently stores programs and various kinds of data for operation of the frequency management server 100.

For example, the storage unit 120 stores an available frequency list including location information, and an unused frequency which is not locally used at a location indicted by the location information, that is, information of an available frequency. An expression method of the location information in the available frequency list is not particularly limited. For example, the location information may be expressed with a latitude range and a longitude range, or may be expressed with a central position and a radial distance.

For example, the storage unit 120 stores list information created in the past, which will be described later. The list information is stored in association with the portable communication devices 200 which use the list information. Further, the storage unit 120 may store setting values of frequency channels and transmission power reported from the portable communication devices 200.

(3) Processing Unit 130

The processing unit 130 provides various functions of the frequency management server 100. The processing unit 130 includes an acquiring unit 131, a creating unit 132, a re-creation judging unit 133 and a notification unit 134. Note that the processing unit 130 can further include constituent elements other than these constituent elements. That is, the processing unit 130 can perform operation other than operation of these constituent elements. Functional configurations of the respective constituent elements will be described in detail below.

(Acquiring Unit 131)

The acquiring unit 131 acquires a step size relating to transmission power setting of the portable communication device 200. There can be various acquisition routes. For example, the acquiring unit 131 may acquire the step size from a message received from the portable communication device 200. Further, the acquiring unit 131 may acquire a step size from other databases in which step sizes of the portable communication devices 200 are registered. Further, the acquiring unit 131 may acquire a step size on the basis of specifications, types, or the like, of hardware components used in the portable communication devices 200.

The step size relating to transmission power setting is a minimum setting unit of the transmission power. The portable communication device 200 changes the transmission power in units of a step size. The portable communication device 200 cannot change the transmission power with a change width less than the step size. The step size can be typically determined by specifications of hardware. Note that, in the case where there are a plurality of step sizes, the step size in the present specification indicates the minimum step size among the step sizes.

Further, the acquiring unit 131 acquires location information of the portable communication device 200. There can be various acquisition routes. The acquiring unit 131 may acquire the location information from a message received from the portable communication device 200. Further, the acquiring unit 131 may acquire the location information from other databases in which location information of the portable communication devices 200 is registered.

(Creating Unit 132)

The creating unit 132 creates list information including one or more combinations of frequency information and transmission power information in accordance with the location information of the portable communication device 200. Here, the frequency information is information indicating a frequency available to the portable communication device 200. The creating unit 132 acquires an available frequency in accordance with the location information with reference to the storage unit 120 when creating the list information. Further, the transmission power information is information indicating maximum allowable transmission power which is a maximum value of transmission power which can be set at the portable communication device 200. The creating unit 132 calculates the allowable maximum transmission power in accordance with the location information when creating the list information.

For example, the creating unit 132 calculates the allowable maximum transmission power on the basis of a path loss value calculated on the basis of a distance between a location of the portable communication device 200 and a location of a reference point, concerning a certain available frequency. The reference point is a primary system of a frequency to be judged. The creating unit 132 can calculate the allowable maximum transmission power within a range where the primary system can be protected by calculating the allowable maximum transmission power on the basis of the distance to the reference point. Note that location information of the reference point is acquired from a regulator such as government organizations.

According to specification of ECC Report 186, the allowable maximum transmission power is calculated using the following equation (1).

[Math. 1]

$$P_{wsd\_tx\_dBm} \leq m_{\hat{Z}\_dBm} - m_{G\_dB} - r_{wsd\_dB} - \sqrt{2}\,erfc^{-1}\left[2\left(1 - \frac{q_2}{q_1}\right)\right]\sqrt{\sigma^2_{\hat{Z}\_dB} + \sigma^2_{G\_dB}} - IM_{dB} \quad (1)$$

A left-hand side of the above-described equation (1) corresponds to a transmission power value of the portable communication device 200, and a right-hand side corresponds to a calculated value of the allowable maximum transmission power of the portable communication device 200. Here, $m_{G\_dB}$ is coupling gain between the reference point and the portable communication device 200. Note that the coupling gain is a path gain value in which antenna gain, or the like, is added, and $-m_{G\_dB}$ corresponds to a path loss value in which antenna gain, or the like, is added. Further, $m_{\hat{Z}\_dBm}$ is allowable received interference power. $r_{wsd\_dB}$ is a protection ratio. $q_i$ is a location probability which becomes a reference. $q_2$ is a location probability after degradation due to interference.

$\sigma_{\hat{Z}\_dB}$ is standard deviation of the allowable received interference power. $\sigma_{G\_dB}$ is standard deviation of $m_{G\_dB}$. $IM_{dB}$ is interference margin.

The creating unit 132 performs the above-described calculation for each available frequency to create the list information.

(Re-Creation Judging Unit 133)

The re-creation judging unit 133 judges whether or not to create the list information again for the portable communication device 200 for which the creating unit 132 has created the list information. For example, the re-creation judging unit 133 judges whether or not to re-create the list information on the basis of location information of the portable communication device 200 when the list information has been created last time (corresponding to first location information), current location information of the portable communication device 200 (corresponding to second location information to be judged) and the step size. In the case where it is judged to re-create the list information, the creating unit 132 creates the list information on the basis of the current location information of the portable communication device 200. Meanwhile, in the case where it is judged not to re-create the list information, the creating unit 132 reutilizes the list information created last time without creating the list information. In this manner, by performing judgment not to re-create the list information, it is possible to suppress calculation load. The re-creation judgement will be described in more detail below with reference to FIG. 4.

Figure 4:
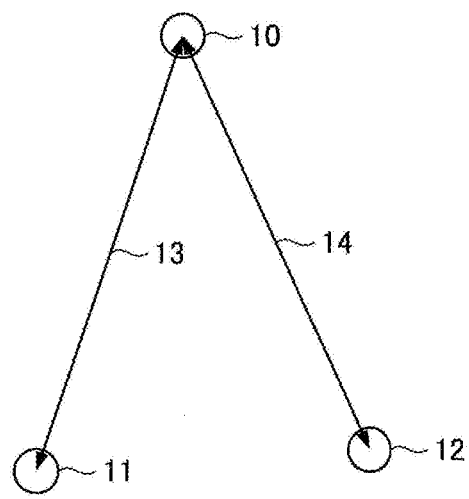
FIG. 4 is a drawing for explaining list information re-creation judgement by the frequency management server according to the embodiment.

FIG. 4 is a drawing for explaining list information re-creation judgement to be performed by the frequency management server 100 according to the present embodiment. Time at which the list information has been created last time is set at $t_0$, and time to be judged as to whether or not to re-create the list information is set at $t_1$. FIG. 4 illustrates a location 10 of the reference point, a location 11 of the portable communication device 200 at time $t_0$ (location indicated by the first location information), and a location 12 of the portable communication device 200 at time $t_1$ ($t_0 < t_1$) (location indicated by the second location information). This gap between the locations occur by movement of the portable communication device 200 or a positioning error, or the like. FIG. 4 illustrates a path loss $PL_{dB}(t_0)$ 13 at time $t_0$, and illustrates a path loss $PL_{dB}(t_1)$ 14 at time $t_1$.

Coupling gain at time $t_0$ and time $t_1$ are respectively set as $m_{G\_dB}(t_0)$ and $m_{G\_dB}(t_1)$. A difference of the allowable transmission power between time $t_0$ and $t_1$ is calculated using the following equation (4) as a difference between the allowable transmission power at time $t_0$ indicated in the following equation (2) and the allowable transmission power at time $t_1$ indicated in the following equation (3).

[Math. 2]

$$P_{wsd\_tx\_dBm}(t_0) - m_{\hat{Z}\_dBm} - m_{G\_dB}(t_0) - r_{wsd\_dB} - \sqrt{2}\,erfc^{-1}\left[2\left(1 - \frac{q_2}{q_1}\right)\right]\sqrt{\sigma_{\hat{Z}\_dB}^2 + \sigma_{G\_dB}^2} - IM_{dB} \quad (2)$$

[Math. 3]

$$P_{wsd\_tx\_dBm}(t_1) - m_{\hat{Z}\_dBm} - m_{G\_dB}(t_1) - r_{wsd\_dB} - \sqrt{2}\,erfc^{-1}\left[2\left(1 - \frac{q_2}{q_1}\right)\right]\sqrt{\sigma_{\hat{Z}\_dB}^2 + \sigma_{G\_dB}^2} - IM_{dB} \quad (3)$$

[Math. 4]

$$P_{wsd\_tx\_dBm}(t_0) - P_{wsd\_tx\_dBm}(t_1) \le m_{G\_dB}(t_1) - m_{G\_dB}(t_0) \quad (4)$$

If coupling gain $m_{G\_dB}(t_0)$ and $m_{G\_dB}(t_1)$ are changed to path loss values $-PL_{dB}(t_0)$ and $-PL_{dB}(t_1)$ in the above-described equation (4), the following equation (5) is obtained.

[Math. 5]

$$P_{wsd\_tx\_dBm}(t_0) - P_{wsd\_tx\_dBm}(t_1) \le PL_{dB}(t_0) - PL_{dB}(t_1) \quad (5)$$

As indicated in the above-described equation (5), the portable communication device 200 obtains the setting value of the transmission power at time $t_1$ by changing the setting value of the transmission power at time $t_0$ by an amount corresponding to an absolute value of a difference of the path losses $|PL_{dB}(t_0) - PL_{dB}(t_1)|$ (unit: dB). However, due to typical hardware specifications, the portable communication device 200 changes the transmission power in units of a predetermined step size. That is, in the case where $|PL_{dB}(t_0) - PL_{dB}(t_1)|$ is less than a step size, the portable communication device 200 cannot change the transmission power to transmission power as calculated.

Therefore, the re-creation judging unit 133 judges whether or not to re-create the list information on the basis of a result of comparison between a change width of transmission power setting at the portable communication device 200 calculated from the location information of the reference point, the first location information and the second location information, and the step size. While, in the above-described calculation equation, the change width of the transmission power setting is calculated from a difference of path losses, the change width of the transmission power setting may be calculated using other methods. According to the above-described calculation equation, the re-creation judging unit 133 judges whether or not to re-create the list information on the basis of a result of comparison between the difference of the path losses (to be more exact, an absolute value) calculated on the basis of the location information of the reference point, the first location information and the second location information, and the step size. Specifically, the re-creation judging unit 133 judges not to re-create the list information in the case where the absolute value of the difference of the path losses is less than the step size. By this means, in the case where the portable communication device 200 cannot change the transmission power to transmission power as calculated even if the portable communication device 200 is notified of the re-created list information, it is possible to skip re-creation of the list information to suppress calculation load. Meanwhile, in the case where the absolute value of the difference of the path losses is equal to or greater than the step size, the re-creation judging unit 133 judges to re-create the list information. By this means, in the case where the portable communication device 200 can change the transmission power to transmission power as calculated by being notified of the recreated list information, it is possible to cause the portable communication device 200 to change the transmission power by re-creating the list information.

Note that, while, in the above description, an example has been described where there is one reference point, there may be a plurality of reference points. In this case, for example, the re-creation judging unit 133 judges not to re-create the list information in the case where the transmission power change width (that is, the absolute value of the difference of the path losses) is less than the step size for all the reference points to be taken into account. Meanwhile, the re-creation judging unit 133 judges to re-create the list information in the case where the transmission power change width is equal to or greater than the step size for one of the plurality of reference points to be taken into account.

The re-creation judging unit 133 may judge whether or not to re-create the list information for each frequency channel to be taken into account. The frequency channel to be taken into account is, for example, an available frequency included in the list information. For example, the re-creation judging unit 133 judges not to re-create the list information in the case where the transmission power change width is less than the step size for all the frequency channels to be taken into account. Meanwhile, the re-creation judging unit 133 judges to re-create the list information in the case where the transmission power change width is equal to or greater than the step size for one of the plurality of frequency channels to be taken into account.

(Notification Unit 134)

The notification unit 134 notifies the portable communication device 200 of the information.

For example, the notification unit 134 notifies the portable communication device 200 which uses the list information of the re-created list information in the case where it is judged by the re-creation judging unit 133 to re-create the list information, and of the list information created last time in the case where it is judged not to re-create the list information. Specifically, the notification unit 134 notifies the portable communication device 200 for which the list information has never been created of list information which is newly created. Meanwhile, the notification unit 134 notifies the portable communication device 200 for which the list information has been created in the past of the re-created list information in the case where the list information is re-created, and of the list information created last time in the case where re-creation is skipped. In either case, the portable communication device 200 can set an appropriate frequency and transmission power on the basis of the list information. Of course, the portable communication device 200 which is a notification destination is the portable communication device 200 which is an acquisition source of the location information used for creating the list information.

<2.2. Configuration Example of Portable Communication Device>

Figure 5:
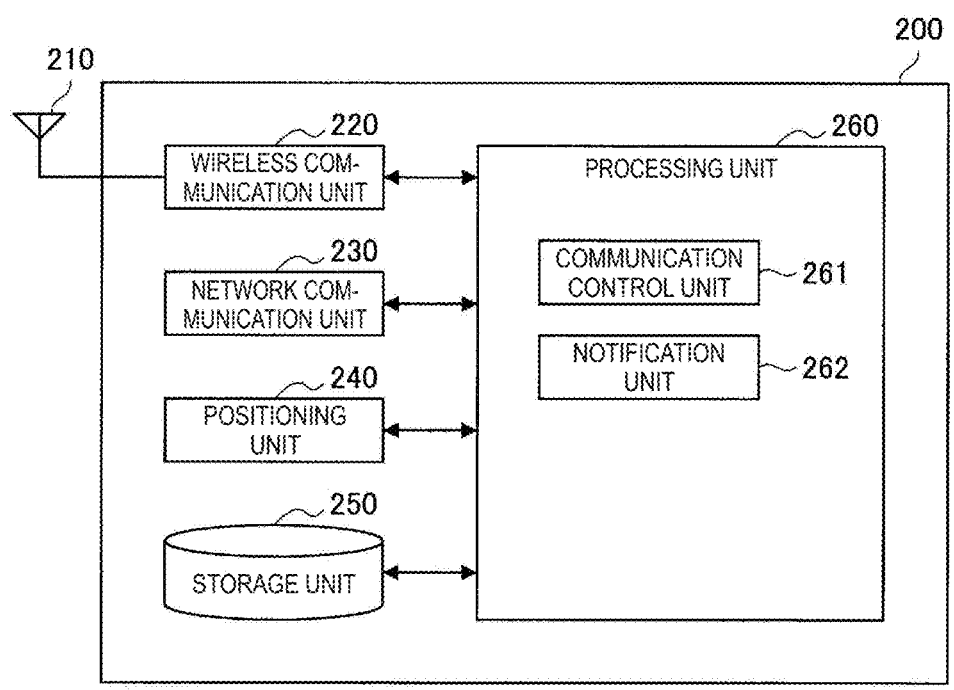
FIG. 5 is a block diagram illustrating an example of a logical configuration of a portable communication device according to the embodiment.

FIG. 5 is a block diagram illustrating a logical configuration of the portable communication device 200 according to the present embodiment. As illustrated in FIG. 5, the portable communication device 200 includes an antenna unit 210, a wireless communication unit 220, a network communication unit 230, a positioning unit 240, a storage unit 250 and a processing unit 260.

(1) Antenna Unit 210

The antenna unit 210 emits signals output from the wireless communication unit 220 to space as radio waves. Further, the antenna unit 210 converts radio waves in space into signals and outputs the signals to the wireless communication unit 220.

(2) Wireless Communication Unit 220

The wireless communication unit 220 transmits/receives signals. For example, the wireless communication unit 220 transmits signals to other communication devices within a service providing area, and receives signals from other communication devices within the service providing area.

(3) Network Communication Unit 230

The network communication unit 230 transmits/receives information. For example, the network communication unit 230 transmits information to other nodes, and receives information from other nodes. For example, the above-described other nodes include other portable communication devices 200 and the frequency management server 100.

(4) Positioning Unit 240

The positioning unit 240 measures a location of the portable communication device 200 to acquire location information. The positioning unit 240, for examples, receives a global navigation satellite system (GNSS) signal (for example, a global positioning system (GPS) signal from a GPS satellite) from a GNSS satellite to acquire location information including latitude, longitude and altitude of the device. Note that the positioning unit 240 may acquire location information using other arbitrary technologies. For example, the positioning unit 240 may acquire location information through Wi-Fi (registered trademark), transmission/reception with a mobile phone, a PHS, a smartphone, or the like, near field communication, or the like.

(5) Storage Unit 250

The storage unit 250 temporarily or permanently store programs and various kinds of data for operation of the portable communication device 200.

(6) Processing Unit 260

The processing unit 260 provides various functions of the portable communication device 200. The processing unit 260 includes a communication control unit 261 and a notification unit 262. Note that the processing unit 260 can further include constituent elements other than these constituent elements. That is, the processing unit 260 can perform operation other than operation of these constituent elements. Functional configurations of the respective constituent elements will be described in detail below.

(Communication Control Unit 261)

The communication control unit 261 controls wireless communication in the service providing area.

For example, the communication control unit 261 functions as a so-called base station, and provides wireless communication service to the service providing area. Specifically, the communication control unit 261 performs communication with other communication devices which are wirelessly connected to the portable communication device 200 on the basis of the transmission power setting and relays communication between the other communication devices and a network (such as, for example, a core network and the Internet). By this means, the communication devices which are connected to the portable communication device 200 can perform communication with the network.

For example, the communication control unit 261 sets a frequency and transmission power to be used on the basis of the list information created by the frequency management server 100 in accordance with the location information of the portable communication device 200. Because frequency setting and transmission power setting are performed on the basis of the list information created in accordance with the location information of the portable communication device 200, it is possible to secure communication quality within the service providing area, particularly at an edge portion of the service providing area.

(Notification Unit 262)

The notification unit 262 notifies the frequency management server 100 of information.

For example, the notification unit 262 notifies the frequency management server 100 of information indicating a step size relating to transmission power setting. For example, the notification unit 262 notifies the frequency management server 100 of the information indicating the step size through procedure for registering a device ID, or the like, or in a request for generating information regarding an available frequency band. By this means, it is possible to judge whether or not to re-create the list information at the frequency management server 100.

For example, the notification unit 262 notifies the frequency management server 100 of the location information of the portable communication device 200. By this means, the portable communication device 200 can receive list information in accordance with a current location from the frequency management server 100 and set an appropriate frequency and transmission power.

For example, the notification unit 262 notifies the frequency management server 100 of setting values of a frequency channel and transmission power which are actually set. By this means, it is possible to feed back current setting values to the frequency management server 100.

<3. Processing Flow>

The configuration examples of the respective devices have been described above. Subsequently, flow of processing to be executed in the system 1 will be described with reference to FIG. 6 and FIG. 7.

Figure 6:
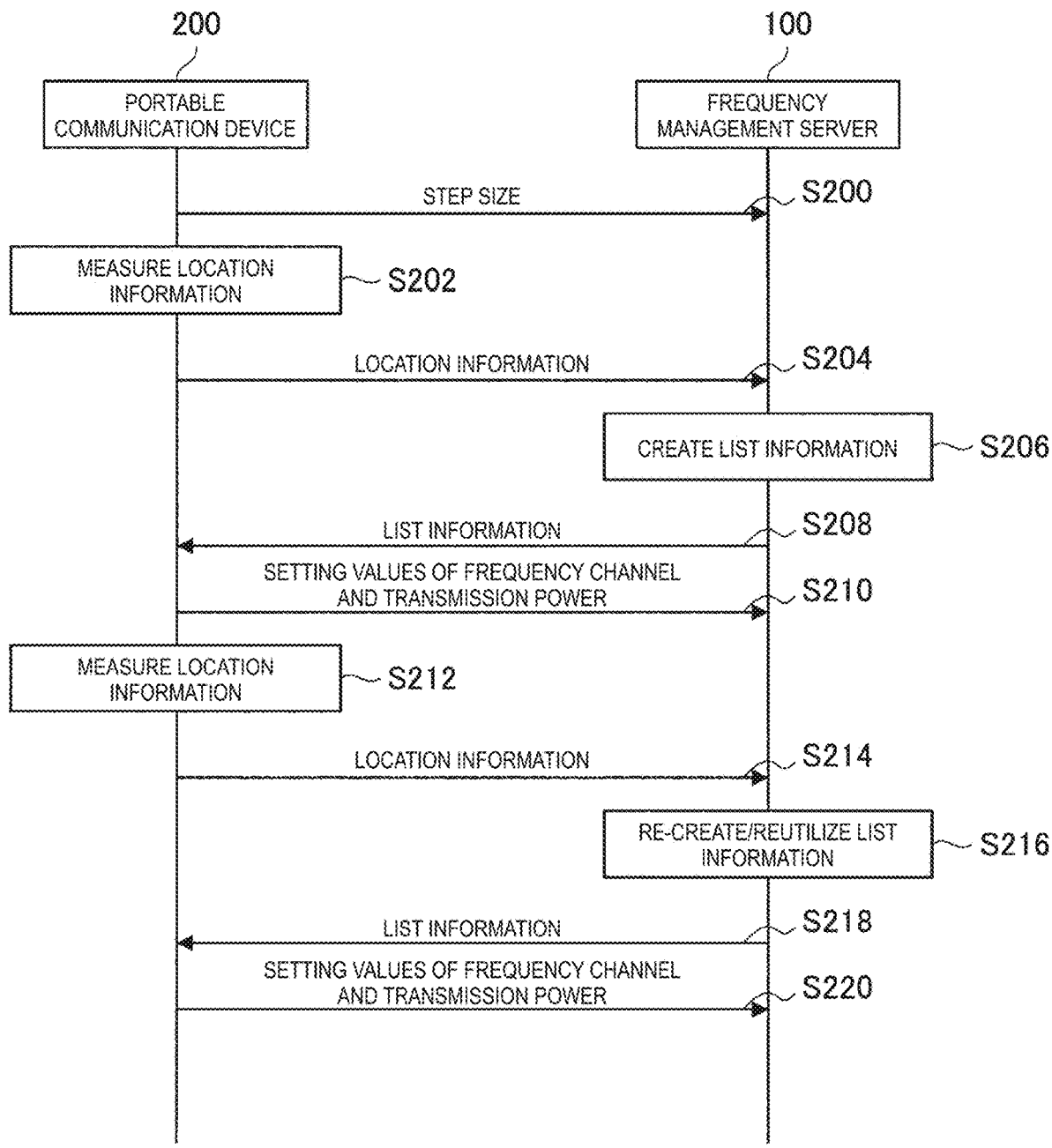
FIG. 6 is a sequence diagram illustrating an example of message transmission/reception procedure to be executed in the system according to the embodiment.

FIG. 6 is a sequence diagram illustrating an example of message transmission/reception procedure to be executed in the system 1 according to the present embodiment. As illustrated in FIG. 6, the frequency management server 100 and the portable communication device 200 are involved with the present sequence.

First, the portable communication device 200 transmits information indicating a step size to the frequency management server 100 as advance preparation (step S200).

The portable communication device 200 then measures location information (step S202), and transmits the measured location information to the frequency management server 100 (step S204). The location information may be included in, for example, AVAIL_SPECTRUM_RESP described with reference to FIG. 2 and transmitted. The frequency management server 100 then creates list information (step S206), and transmits the created list information to the portable communication device 200 (step S208). The list information may be included in, for example, AVAIL_SPECTRUM_REQ described with reference to FIG. 2 and transmitted. The portable communication device 200 then sets a frequency and transmission power on the basis of the received list information and reports setting values of the frequency channel and transmission power to be used to the frequency management server 100 (step S210).

The portable communication device 200 then measures location information again (step S212), and transmits the measured location information to the frequency management server 100 (step S214). The frequency management server 100 then re-creates the list information or reutilizes the list information created last time (step S216), and transmits the re-created or reutilized list information to the portable communication device 200 (step S218). The portable communication device 200 then sets a frequency and transmission power on the basis of the received list information and reports setting values of the frequency channel and the transmission power to be used to the frequency management server 100 (step S220).

The processing is finished as described above. The above-described judgement in step S216 will be described below with reference to FIG. 7.

Figure 7:
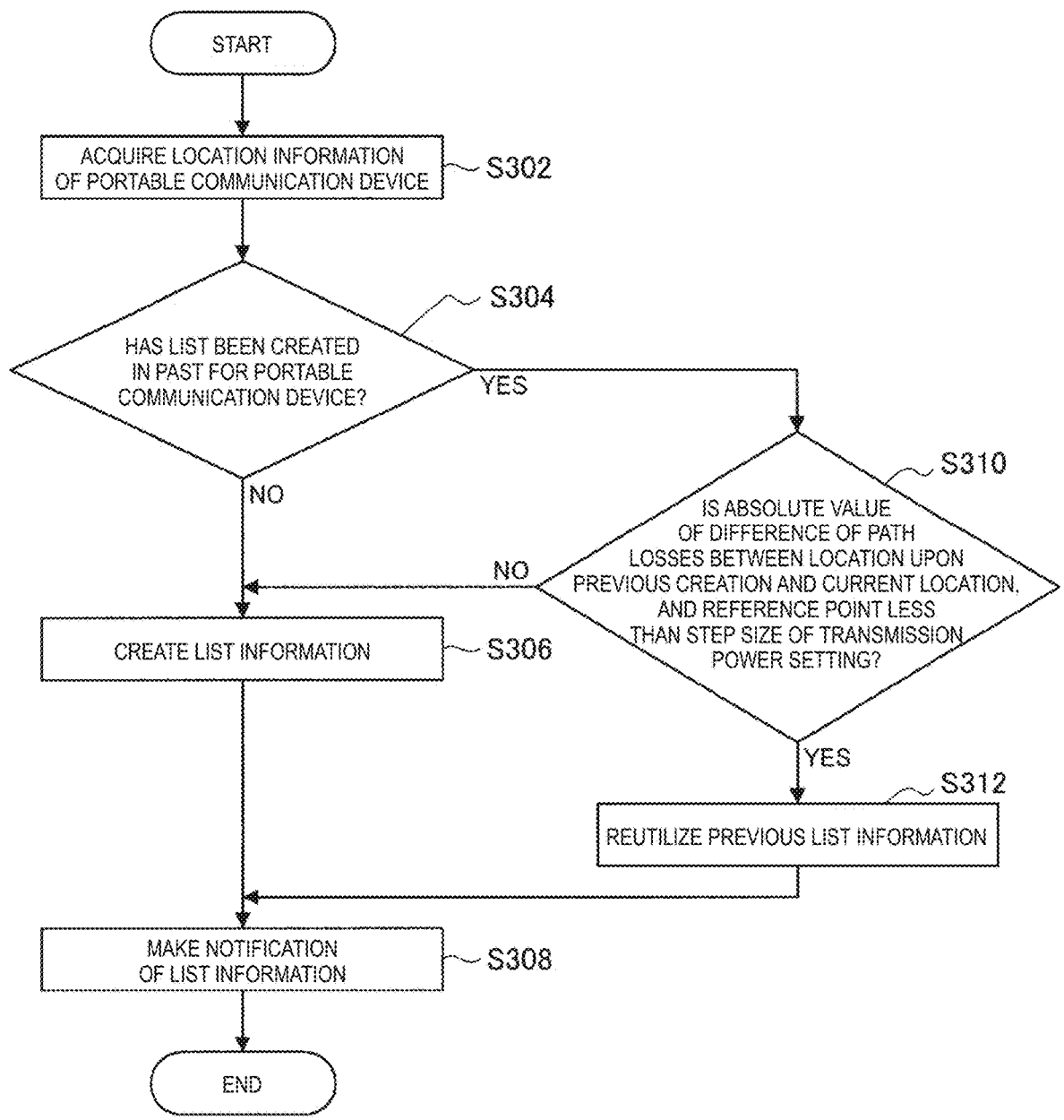
FIG. 7 is a flowchart illustrating an example of flow of list information re-creation judgement processing to be executed at the frequency management server according to the embodiment.

FIG. 7 is a flowchart illustrating an example of flow of list information re-creation judgement processing to be executed at the frequency management server 100 according to the present embodiment. As illustrated in FIG. 7, first, the acquiring unit 131 acquires the location information of the portable communication device 200 (step S302). The re-creation judging unit 133 then judges whether or not the list information has been created in the past for the portable communication device 200 (step S304). In the case where it is judged that the list information has not been created in the past (step S304: No), the re-creation judging unit 133 judges to newly create the list information, and the creating unit 132 creates the list information (step S306). Meanwhile, in the case where it is judged that the list information has been created in the past (step S304: Yes), the re-creation judging unit 133 judges whether or not an absolute value of a difference of path losses between a location when the list information has been created last time and the current location, and the location of the reference point is less than a step size of the transmission power setting (step S310). In the case where it is judged that the absolute value of the difference of the path losses is equal to or greater than the step size (step S310: No), the re-creation judging unit 133 judges to re-create the list information, and the creating unit 132 creates the list information (step S306). Meanwhile, in the case where it is judged that the absolute value of the difference of the path losses is less than the step size (step S310: Yes), the re-creation judging unit 133 judges not to re-create the list information and reutilizes the list information created last time (step S312). The notification unit 134 then notifies the portable communication device 200 of the recreated or reutilized list information (step S308).

The processing is finished as described above.

<<4. Application Examples>>

The technology of the present disclosure can be applied to various products. For example, the frequency management server 100 may be realized as a server of any type such as a tower server, a rack server, a blade server, or the like. In addition, the frequency management server 100 may be a control module mounted in a server (e.g., an integrated circuit module configured in one die or a card or a blade inserted into a slot of a blade server).

Further, the portable communication device 200 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the portable communication device 200 may be realized as another type of base station such as a node B or a base transceiver station (BTS). The portable communication device 200 may include a main body that controls radio communication (also referred to as a base station device) and one or more remote radio heads (RRHs) disposed in a different place from the main body. In addition, various types of terminals to be described below may operate as the portable communication device 200 by temporarily or semi-permanently executing the base station function.

<4.1. Application Example with Regard to Frequency Management Server>

Figure 8:
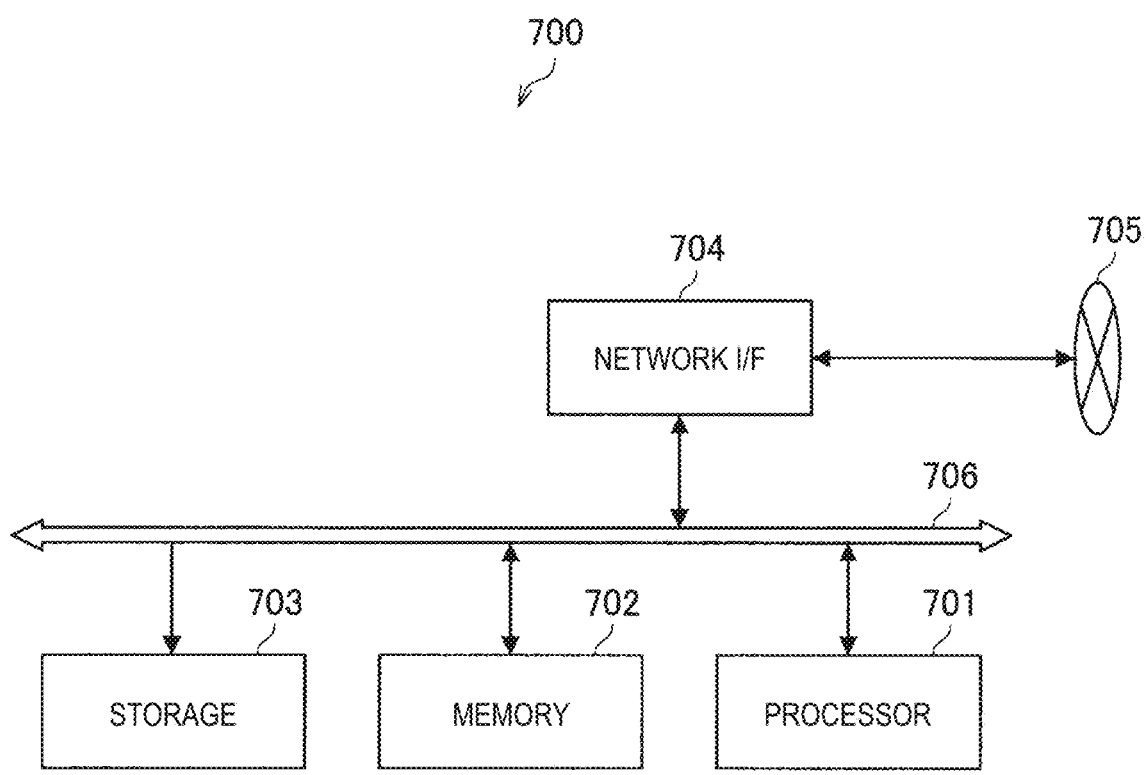
FIG. 8 is a block diagram illustrating an example of a schematic configuration of a server.

FIG. 8 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP) and controls various functions of the server 700. The memory 702 includes a random access memory (RAM) and a read only memory (ROM) and stores programs executed by the processor 701 and data. The storage 703 can include a storage medium such as a semiconductor memory or a hard disk.

The network interface 704 is a wired communication interface for connecting the server 700 to a wired communication network 705. The wired communication network 705 may be a core network such as an evolved packet core (EPC) or a packet data network (PDN) such as the Internet.

The bus 706 connects the processor 701, the memory 702, the storage 703, and the network interface 704 to each other. The bus 706 may include two or more buses that operate at different speeds (e.g., a high-speed bus and a low-speed bus).

In the server 700 illustrated in FIG. 8, one or more constituent elements (the acquiring unit 131, the creating unit 132, the re-creation judging unit 133 and/or the notification unit 134) included in the processing unit 130 described with reference to FIG. 3 may be implemented by the processor 701. As an example, a program for causing a processor to function as the one or more constituent elements (i.e., a program for causing a processor to execute operations of the one or more constituent elements) may be installed in the server 700 and the processor 701 may execute the program. As another example, a module including the processor 701 and the memory 702 may be mounted in the server 700 and the one or more constituent elements may be implemented by the module. In this case, the module may store a program for causing a processor to function as the one or more constituent elements in the memory 702 and the program may be executed by the processor 701. The server 700 or the module may be provided as devices having the one or more constituent elements as described above, or the program for causing a processor to function as the one or more constituent elements may be provided. In addition, a readable recording medium in which the program is recorded may be provided.

In addition, in the server 700 shown in FIG. 8, the network communication unit 110 described, for example, with reference to FIG. 3 may be implemented by the network interface 704. Moreover, the storage unit 120 may be implemented by the memory 702 and/or the storage 703.

<4.2. Application Example with Regard to Base Station]
(First Application Example)

Figure 9:
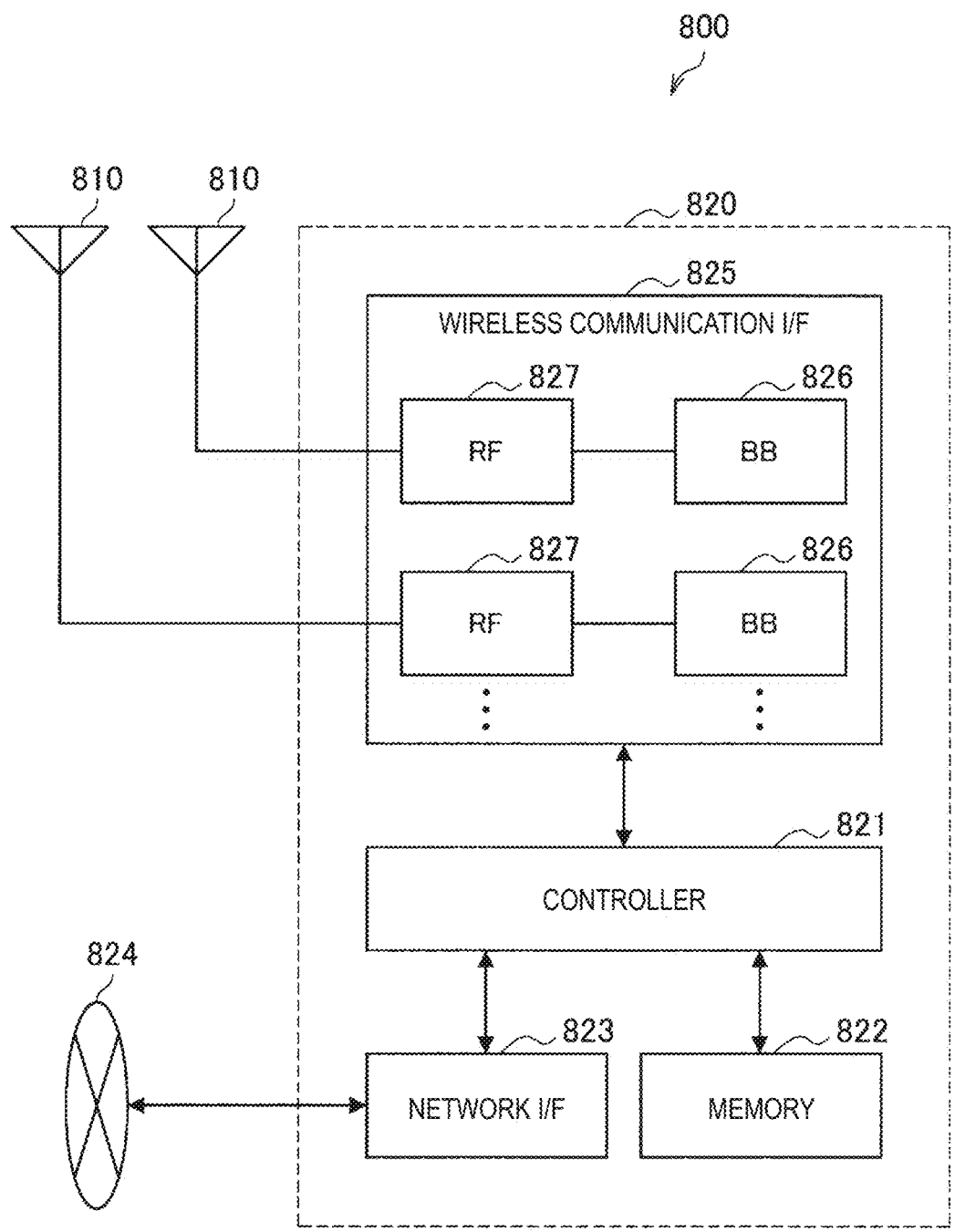
FIG. 9 is a block diagram illustrating a first example of a schematic configuration of an eNB.

FIG. 9 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in a MIMO antenna), and is used for the base station device 820 to transmit and receive radio signals. The eNB 800 may include the multiple antennas 810, as illustrated in FIG. 9. For example, the multiple antennas 810 may be compatible with multiple frequency bands used by the eNB 800. Although FIG. 9 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In this case, the eNB 800 may be connected to a core network node or another eNB through a logical interface (e.g. S1 interface or X2 interface). The network interface 823 may also be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 9. For example, the multiple BB processors 826 may be compatible with multiple frequency bands used by the eNB 800. The wireless communication interface 825 may include the multiple RF circuits 827, as illustrated in FIG. 9. For example, the multiple RF circuits 827 may be compatible with multiple antenna elements. Although FIG. 9 illustrates the example in which the wireless communication interface 825 includes the multiple BB processors 826 and the multiple RF circuits 827, the wireless communication interface 825 may also include a single BB processor 826 or a single RF circuit 827.

In the eNB 800 shown in FIG. 9, one or more constituent elements (the communication control unit 251 and/or the notification unit 262) included in the processing unit 260 described with reference to FIG. 5 may be implemented by the wireless communication interface 825. Alternatively, at least some of these constituent elements may be implemented by the controller 821. As an example, a module which includes a part (for example, the BB processor 826) or all of the wireless communication interface 825 and/or the controller 821 may be mounted in the eNB 800, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the eNB 800, and the wireless communication interface 825 (for example, the BB processor 826) and/or the controller 821 may execute the program. As described above, the eNB 800, the base station device 820 or the module may be provided as a device which includes the one or more constituent elements, and the program for causing the processor to function as the one or more constituent elements may be provided. In addition, a readable recording medium in which the program is recorded may be provided.

In addition, in the eNB 800 shown in FIG. 9, the wireless communication unit 220 described with reference to FIG. 5 may be implemented by the wireless communication interface 825 (for example, the RF circuit 827). Moreover, the antenna unit 210 may be implemented by the antenna 810. Moreover, the network communication unit 230 may be implemented by the controller 821 and/or the network interface 823. Further, the storage unit 250 may be implemented by the memory 822.

(Second Application Example)

Figure 10:
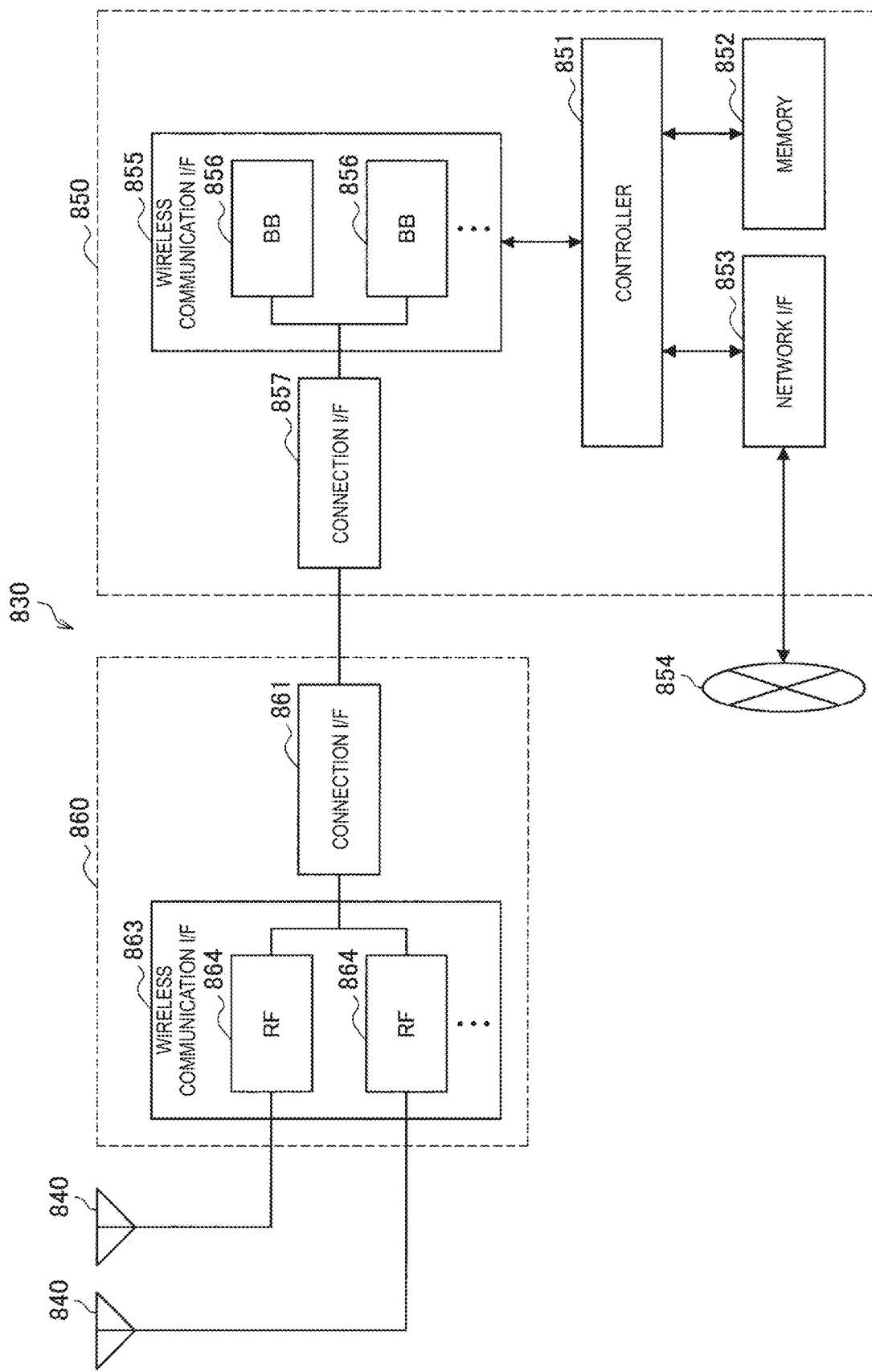
FIG. 10 is a block diagram illustrating a second example of the schematic configuration of the eNB.

FIG. 10 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in a MIMO antenna), and is used for the RRH 860 to transmit and receive radio signals. The eNB 830 may include the multiple antennas 840, as illustrated in FIG. 10. For example, the multiple antennas 840 may be compatible with multiple frequency bands used by the eNB 830. Although FIG. 10 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 9.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 9, except the BB processor 856 is connected to the RF circuit 864 of the RRH 860 via the connection interface 857. The wireless communication interface 855 may include the multiple BB processors 856, as illustrated in FIG. 10. For example, the multiple BB processors 856 may be compatible with multiple frequency bands used by the eNB 830. Although FIG. 10 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 10. For example, the multiple RF circuits 864 may support multiple antenna elements. Although FIG. 10 illustrates the example in which the wireless communication interface 863 includes the multiple RF circuits 864, the wireless communication interface 863 may also include a single RF circuit 864.

In the eNB 830 shown in FIG. 10, one or more constituent elements (the communication control unit 261 and/or the notification unit 262) described with reference to FIG. 5 included in the processing unit 260 may be implemented by the wireless communication interface 855 and/or the wireless communication interface 863. Alternatively, at least some of these constituent elements may be implemented by the controller 851. As an example, a module which includes a part (for example, the BB processor 856) or all of the wireless communication interface 855 and/or the controller 851 may be mounted in the eNB 830, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the eNB 830, and the wireless communication interface 855 and/or the controller 851 may execute the program. As described above, the eNB 830, the base station device 850 or the module may be provided as a device which includes the one or more constituent elements, and the program for causing the processor to function as the one or more constituent elements may be provided. In addition, a readable recording medium in which the program is recorded may be provided.

In addition, in the eNB 830 shown in FIG. 10, the wireless communication unit 220 described, for example, with reference to FIG. 5 may be implemented by the wireless communication interface 863 (for example, the RF circuit 864). Moreover, the antenna unit 210 may be implemented by the antenna 840. Moreover, the network communication unit 230 may be implemented by the controller 851 and/or the network interface 853. Further, the storage unit 250 may be implemented by the memory 852.

<<5. Conclusion>>

An embodiment of the present disclosure has been described in detail above with reference to FIG. 1 to FIG. 10. As described above, the frequency management server 100 according to the present embodiment creates list information including one or more combinations of the frequency information and the transmission power information in accordance with the location information of the portable communication device 200. Further, the frequency management server 100 acquires a step size relating to transmission power setting of the portable communication device 200 and judges whether or not to re-create the list information on the basis of first location information when the list information has been created last time, second location information to be judged and the step size. The frequency management server 100 then notifies the communication device which uses the list information of the re-created list information in the case where it is judged to re-create the list information, and the list information created last time in the case where it is judged not to re-create the list information. By this means, the frequency management server 100 can skip re-creation of the list information in the case where the transmission power setting is not changed at the portable communication device 200. More specifically, the frequency management server 100 can suppress occurrence of unnecessary recalculation to thereby suppress calculation load by judging to re-create list information only in the case where the transmission power change width at the portable communication device 200 is equal to or greater than the step size.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above-described embodiment, description has been provided assuming scenario in which frequency utilization of the communication devices is managed by the frequency management server as in a television white space frequency spectrum (TVWS) or a 3.5 GHz band in the U.S. However, the present technology is not limited to such an example. For example, the present technology can be applied to arbitrary scenario in which transmission power is calculated on the basis of the location information of the communication device. For example, the present technology can be applied to management of frequency utilization for preventing interference between local networks included in one radio system as well as management of frequency utilization for preventing interference between different radio systems. Further, for example, the present technology can be applied to manage a frequency to be used by a flying object like a drone at a frequency management server. Particularly, in the case where a flying object functions as a base station while staying in the air or moving, transmission power control based on the location information can be required. Because calculation load of the frequency management server due to variation of the location information can be problematic also in such a case, it can be possible to suppress calculation load of the frequency management server by application of the present technology.

For example, the processing described herein with reference to the flowcharts and the sequence diagrams does not necessarily have to be executed in the illustrated order. Some processing steps may be executed in parallel. In addition, additional processing steps may also be adopted, while some of the processing steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A management server including:

a creating unit configured to create list information including one or more combinations of frequency information and transmission power information in accordance with location information of a communication device;

an acquiring unit configured to acquire a step size relating to transmission power setting of the communication device;

a re-creation judging unit configured to judge whether or not to re-create the list information on the basis of first location information when the list information has been created last time, second location information to be judged and the step size; and a notification unit configured to notify the communication device which uses the list information, of the re-created list information in a case where it is judged to re-create the list information and the list information created last time in a case where it is judged not to re-create the list information.

(2)

The management server according to (1), in which the re-creation judging unit judges whether or not to re-create the list information on the basis of a result of comparison between a change width of the transmission power setting at the communication device calculated from location information of a reference point, the first location information and the second location information, and the step size.

(3)

The management server according to (2), in which the re-creation judging unit judges whether or not to re-create the list information on the basis of a result of comparison between a difference of path losses calculated on the basis of location information of the reference point, the first location information and the second location information, and the step size.

(4)

The management server according to (3), in which the re-creation judging unit judges not to re-create the list information in a case where an absolute value of the difference of the path losses is less than the step size.

(5)

The management server according to (3) or (4), in which the re-creation judging unit judges to re-create the list information in a case where an absolute value of the difference of the path losses is equal to or greater than the step size.

(6)

The management server according to any one of (2) to (5), in which the reference point is a primary system of a frequency to be judged.

(7)
The management server according to any one of (1) to (6),
in which the frequency information is information indicating a frequency available to the communication device, and
the transmission power information is information indicating a maximum value of transmission power which is settable at the communication device.
(8)
A communication device including:
a notification unit configured to notify a management server of information indicating a step size relating to transmission power setting.
(9)
The communication device according to (8), further including:
a communication control unit,
in which the notification unit notifies the management server of location information of the communication device, and
the communication control unit performs the transmission power setting on the basis of list information including one or more combinations of frequency information and transmission power information, created by the management server in accordance with the location information.
(10)
The communication device according to (8) or (9), further including:
a communication control unit configured to perform communication with another communication device which is wirelessly connected to the communication device on the basis of the transmission power setting, and relay communication between the other communication device and a network.
(11)
A method including:
creating list information including one or more combinations of frequency information and transmission power information in accordance with location information of a communication device;
acquiring a step size relating to transmission power setting of the communication device;
judging by a processor whether or not to re-create the list information on the basis of first location information when the list information has been created last time, second location information to be judged and the step size; and
notifying the communication device which uses the list information, of the re-created list information in a case where it is judged to re-create the list information and the list information created last time in a case where it is judged not to re-create the list information.
(12)
A method including:
notifying a management server of information indicating a step size relating to transmission power setting, by a processor.
(13)
A recording medium having a program recorded thereon, the program causing a computer to function as:
a creating unit configured to create list information including one or more combinations of frequency information and transmission power information in accordance with location information of a communication device;
an acquiring unit configured to acquire a step size relating to transmission power setting of the communication device;
a re-creation judging unit configured to judge whether or not to re-create the list information on the basis of first location information when the list information has been created last time, second location information to be judged and the step size; and
a notification unit configured to notify the communication device which uses the list information, of the re-created list information in a case where it is judged to re-create the list information and the list information created last time in a case where it is judged not to re-create the list information.
(14)
A recording medium having a program recorded thereon, the program causing a computer to function as:
a notification unit configured to notify a management server of information indicating a step size relating to transmission power setting.

REFERENCE SIGNS LIST 1 system
100 frequency management server
110 network communication unit
120 storage unit
130 processing unit
131 acquiring unit
132 creating unit
133 re-creation judging unit
134 notification unit
200 portable communication device
210 antenna unit
220 wireless communication unit
230 network communication unit
240 positioning unit
250 storage unit
260 processing unit
261 communication control unit
262 notification unit
300 primary system

The invention claimed is:
1. A communication device comprising:
processing circuitry configured to notify first location information of the communication device at a first acquisition time to a management server;
receive list information that has been created, including one or a combination of frequency information and transmission power information, from the management server and
perform transmission power setting based on the list information, wherein the list information is judged whether or not to be re-created, after the list information has been created, based on the first location information of the communication device, second location information of the communication device at a second acquisition time earlier than the first acquisition time, and a step size relating to the transmission power setting of the communication device, and
the list information is judged whether or not to be re-created. after the list information has been created, based on a result of comparison between: (1) a change width of the transmission power setting at the communication device calculated from location information of a reference point, the first location information and the second location information, and (2)the step size.
2. The communication device according to claim 1, wherein the list information is judged whether or not to be re-created based on a result of comparison between: (1) a difference of path losses calculated on a basis of location information of the reference point, the first location information and the second location information, and (2) the step size.

3. The communication device according to claim 2, wherein the list information is judged not to be re-created in a case where an absolute value of the difference of the path losses is less than the step size.

4. The communication device according to claim 2, wherein the list information is judged to be re-created in a case where an absolute value of the difference of the path losses is equal to or greater than the step size.

5. The communication device according to claim 1, wherein the reference point is a primary system of a frequency to be judged.

6. The communication device according to claim 1, wherein
the frequency information is information indicating a frequency available to the communication device, and
the transmission power information is information indicating a maximum value of transmission power which is settable at the communication device.

7. The communication device according to claim 1, wherein the processing circuitry configured to notify the step size relating to transmission power setting of the communication device to the management server.

8. The communication device according to claim 1, wherein the step size is a minimum setting unit of the transmission power.

9. The communication device according to claim 1, wherein the list information is judged whether or not to be re-created by the management server.

10. A method comprising:
notifying first location information of the communication device at a first acquisition time to a management server;
receiving list information that has been created, including one or a combination of frequency information and transmission power information, from the management server; and
performing, using processing circuitry, transmission power setting based on the list information, wherein
the list information is judged whether or not to be re-created, after the list information has been created, based on the first location information of the communication device, second location information of the communication device at a second acquisition time earlier than the first acquisition time, and a step size relating to the transmission power setting of the communication device, and
the list information is judged whether or not to be re-created. after the list information has been created, based on a result of comparison between: (1) a change width of the transmission power setting at the communication device calculated from location information of a reference point, the first location information and the second location information, and (2) the step size.

11. A non-transitory computer readable medium including executable instructions, which when executed by a computer cause the computer to execute a method comprising:
notifying first location information of the communication device at a first acquisition time to a management server;
receiving list information that has been created, including one or a combination of frequency information and transmission power information, from the management server; and
performing transmission power setting based on the list information, wherein
the list information is judged whether or not to be re-created, after the list information has been created, based on the first location information of the communication device, second location information of the communication device at a second acquisition time earlier than the first acquisition time, and a step size relating to the transmission power setting of the communication device, and
the list information is judged whether or not to be re-created, after the list information has been created, based on a result of comparison between: (1) a change width of the transmission power setting at the communication device calculated from location information of a reference point, the first location information and the second location information, and (2) the step size.

* * * * *